(12) United States Patent
McBride Fesq et al.

(10) Patent No.: US 7,970,751 B2
(45) Date of Patent: Jun. 28, 2011

(54) SYSTEM AND METHOD FOR PERFORMING LOCAL SEARCHES ACROSS USER DEFINED EVENTS

(76) Inventors: William McBride Fesq, New Providence, NJ (US); Michael Emil Ogrinz, Wantage, NJ (US)

(*) Notice: Subject to any disclaimer, the term of this patent is extended or adjusted under 35 U.S.C. 154(b) by 0 days.

(21) Appl. No.: 12/572,544

(22) Filed: Oct. 2, 2009

(65) Prior Publication Data

US 2010/0088337 A1    Apr. 8, 2010

Related U.S. Application Data

(63) Continuation of application No. 10/085,425, filed on Feb. 28, 2002, now abandoned.

(51) Int. Cl.
*G06F 7/00* (2006.01)
*G06F 17/30* (2006.01)

(52) U.S. Cl. ......... 707/706; 707/769; 707/770; 707/802

(58) Field of Classification Search .................. 707/770, 707/706, 769, 802
See application file for complete search history.

(56) References Cited

U.S. PATENT DOCUMENTS

| | | | | |
|---|---|---|---|---|
| 5,948,040 | A * | 9/1999 | DeLorme et al. | 701/201 |
| 6,049,773 | A * | 4/2000 | McCormack et al. | 705/4 |
| 6,779,042 | B1 * | 8/2004 | Kloba et al. | 707/E17.12 |
| 7,251,612 | B1 * | 7/2007 | Parker et al. | 705/9 |
| 7,324,953 | B1 * | 1/2008 | Murphy | 705/10 |
| 2001/0034605 | A1 * | 10/2001 | Hoffman | 705/1 |
| 2001/0049617 | A1 * | 12/2001 | Berenson et al. | 705/8 |
| 2002/0057781 | A1 * | 5/2002 | Fleischer et al. | 379/211.02 |
| 2002/0059283 | A1 * | 5/2002 | Shapiro et al. | 707/100 |
| 2002/0065882 | A1 * | 5/2002 | Arkin et al. | 709/204 |
| 2002/0161756 | A1 * | 10/2002 | Fesq et al. | 707/4 |
| 2003/0154116 | A1 * | 8/2003 | Lofton | 705/8 |
| 2003/0200192 | A1 * | 10/2003 | Bell et al. | 707/1 |
| 2009/0094527 | A1 * | 4/2009 | Parupudi et al. | 715/744 |

OTHER PUBLICATIONS

Lei et al.—"The Design and Applications of Context Service"—ACM SIGMOBILE—Mobile Computing and Communications Review, vol. 6, Issue: 4, 2002 (pp. 1-11; 45-55).*
Kindberg et al.—"People, Places, Things: Web Presence for the Real World"—Mobile Networks and Applications, vol. 7, Issue: 5, 2002 (pp. 1-12; 365-376).*

* cited by examiner

*Primary Examiner* — John Breene
*Assistant Examiner* — Anh Ly
(74) *Attorney, Agent, or Firm* — Seth H. Ostrow; Ostrow Kaufmann LLP

(57) ABSTRACT

The instant invention presents a system and method for performing local searches across one or more events created by one or more users. The system of the present invention comprises an event data structure comprising one or more user defined events, each event associated with a zip code. A zip list processor is provided to receive a zip code and a distance value, e.g., from user defined input, which are used to calculate a zip list comprising all zip codes geographically located with the distance value from the zip code. An event list generator to receives the zip list and queries the event data structure to retrieve events associated with zip codes contained in the zip list. The method of the present invention comprises creating an event data structure comprising one or more user defined events, each event associated with a zip code, calculating a zip list comprising all zip codes geographically located within a distance equal to a received distance value from a received zip code, and querying the event data structure to retrieve events associated with zip codes contained in the zip list.

16 Claims, 12 Drawing Sheets

| Event ID | Calendar ID | Zipcode | Public | Event Date | Descripton |
|---|---|---|---|---|---|
| 101 | 1 | 10019 | Yes | 1/21/01 | BSA Troop Meeting |
| 102 | 2 | 10036 | No | 1/22/01 | Bar Assn Meeting |
| 103 | 1 | 10019 | Yes | 2/12/01 | School Bd. Meeting |
| . | . | . | . | . | . |
| . | . | . | . | . | . |
| . | . | . | . | . | . |

38 — Event ID; 40 — Calendar ID; 42 — Zipcode; 43 — Public; 44 — Event Date; 46 — Descripton; 36

Fig. 2

| Calendar ID (30) | User Name (32) | Password (33) | Contact Info (34) |
|---|---|---|---|
| 1 | John Doe | Hurricane | 111 3rd Avenue |
| 2 | Jane Doe | Bratwurst | 222 2nd Avenue |
| . | . | . | . |

| Event ID (38) | Calendar ID (40) | Zipcode (42) | Public (43) | Event Date (44) | Descripton (46) |
|---|---|---|---|---|---|
| 101 | 1 | 10019 | Yes | 1/21/01 | BSA Troop Meeting |
| 102 | 2 | 10036 | No | 1/22/01 | Bar Assn Meeting |
| 103 | 1 | 10019 | Yes | 2/12/01 | School Bd. Meeting |
| . | . | . | . | . | . |

SYSTEM AND METHOD FOR PERFORMING LOCAL SEARCHES ACROSS USER DEFINED EVENTS

CROSS-REFERENCE TO RELATED APPLICATIONS

This application is a Continuation of U.S. application Ser. No. 10/085,425, filed on Feb. 28, 2002, now abandoned, which is incorporated herein by reference in its entirety.

BACKGROUND OF THE INVENTION

Information technology is one of the primary reasons for the unprecedented growth in use of personal computers. Using application programs developed for different personal computer platforms, an application developer may handle information in a variety of ways. Entirely new industries have been founded based on the ability of the personal computer to acquire, store, and manipulate information.

As the personal computer has continued to increase its penetration into the consumer market, users have found that computers are able to replace many traditional "activities". For example, it is quite common for an individual to keep a calendar in order to maintain their daily events, which is a task excellently suited to the computer. This concept has been extended to the networked computing environment of the Internet whereby calendars are accessible via a network, not just the calendar owner's individual personal computer. Even through interconnections between computers such as that provided by the Internet, however, many application programs used to acquire, store and manipulate personal calendar lack functionality that allows a user to view data across many calendars. Moreover, application such as this lack functionality allowing a user to review events taking place in arbitrary geographical locations as defined by a local user.

In order to assist users in taming vast amounts of information accessible through the Internet, application programmers have developed search engine applications, e.g., yahoo.com. A typical search engine receives one or more keyword parameters from a user and returns a listing of data that incorporates or is a match for the provided keywords. Many search engines, through the use of automated agents such as bots and spiders, collect information by following hyperlinks between documents in order to create an index. The search engine uses the index to create a list of results falling within the scope of the query defined by the user. Currently available search engines have nevertheless failed to provide a solution that allows a user to use current search engine technology to search across calendars for one or more user defined events.

There is thus a need for a system and method that exploits the intersection of web based calendars and search engines in such a way as to allow searches across user defined event for an arbitrary geographic region or regions.

SUMMARY OF THE INVENTION

The present invention comprises a system and method for performing searches across user defined events for an arbitrary geographic region or regions. The system of the present invention comprises an event data structure. The event data structure is made up of one or more user defined events, each associated with a zip code. A zip list processor is provided to receive a zip code and a distance value. These data are used to calculate a zip list comprising all zip codes geographically located with the distance value from the zip code. An event list generator receives the zip list and queries the event data structure to retrieve events associated with zip codes contained in the zip list.

According to one embodiment of the invention, the zip list processor utilizes great circle mathematics to calculate all zip codes geographically located with the distance value from the zip code. A zip data structure is provided to store one or more zip codes and associated latitude and longitude values, which are used by the zip list processor in performing great circle calculations.

The system of the present invention may also comprise a calendar generator to facilitate creation of calendars and a calendar data structure in which to store them. Each of the one or more user defined events are associated with a calendar in the calendar data structure. The calendar generator may further be operative format and present the calendar and associated user defined events on a display device.

The system of the present invention allows a user to mark the user defined events as public or private events. Accordingly, private events are excluded from the query performed by the event list generator.

The present invention further describes a method for performing searches across user defined events for an arbitrary geographic region or regions. The method of the present invention comprises creating an event data structure to contain or manage one or more user defined events. Each event in the event data structure is associated with a zip code. A zip list comprising all zip codes geographically located within a distance equal to a received distance value from a received zip code is calculated and the event data structure is queried to retrieve events associated with zip codes contained in the zip list.

According to some embodiments, calculating the zip list comprises utilizing great circle mathematics to calculate all zip codes geographically located with the distance value from the zip code. The step of calculating may also comprise retrieving zip codes from a zip data structure used to store one or more zip codes and associated latitude and longitude values.

A calendar data structure may be generated along with one or more calendars through the use of a calendar generator. Each of the one or more user defined events may be associated with a calendar in the calendar data structure. The method also comprises the steps of formatting and presenting the calendar and associated user defined events on a display device. The one or more user defined events may be marked as public or private events, wherein querying excludes private events.

BRIEF DESCRIPTION OF THE DRAWINGS

FIG. 2 presents a Calendar Data Structure data file according to one embodiment of the present invention;

FIG. 3 presents an Event Data Structure data file according to one embodiment of the present invention;

FIG. 10 is a screen drawing presenting an interface for defining advanced event searches according to one embodiment of the present invention;

FIG. 13 is a screen drawing presenting an event tool according to one embodiment of the present invention.

DETAILED DESCRIPTION OF THE INVENTION

Figure 1:
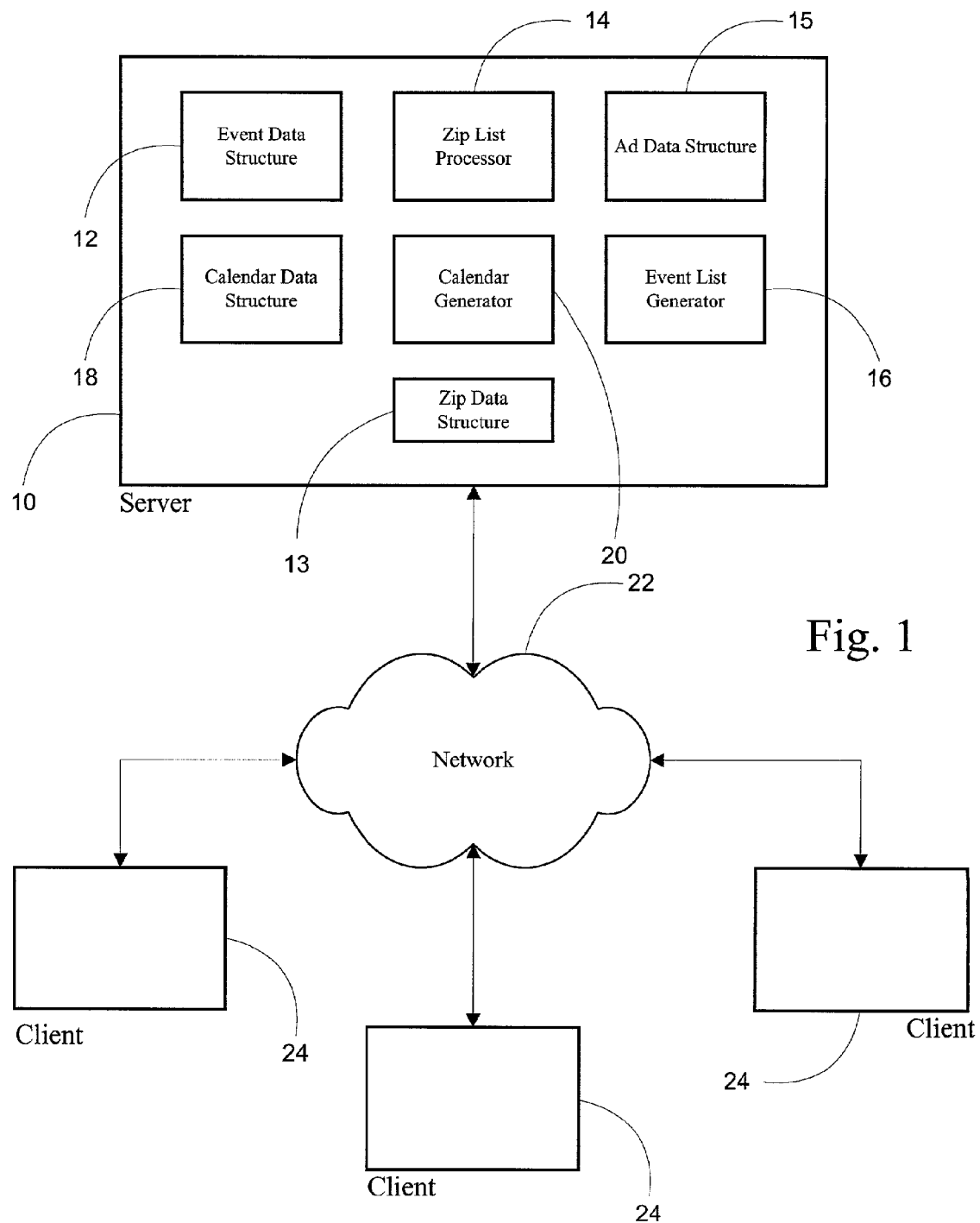
FIG. 1 is a block diagram presenting a configuration of the various hardware and software components according to one embodiment of the present invention.

With reference to FIGS. 1 through 12, detailed embodiments of the present invention are now described. Referring to FIG. 1, a system of one preferred embodiment of the invention is implemented in a computer network environment such as the Internet, an intranet, or other closed or organizational network. A number of clients 24 and servers 10 are connected to a network 22 by various means, such as network interface hardware (not pictured). For example, if the network 22 is the Internet, the servers 10 may be web servers that receive requests for data from clients 24 via HTTP, retrieve the requested data, and deliver them to the client 24 over the network 22. The transfer may be according to TCP or UDP protocols, and data transmitted from the server 10 are preferably unicast to requesting clients.

The server 10 contains several components or systems including a calendar generator 20, a zip list processor 14, and an event list generator 16. The server 10 further contains a plurality of data structures or resource files including a calendar data structure 18, an event data structure 12, an advertisement data structure 15, and a zip data structure 13. These components may be comprised of hardware and software elements, or may be implemented as software programs residing and executing on a general purpose computer and which cause the computer to perform the functions described in greater detail below.

A calendar generator 20 is provided that facilitates creation of new calendars and presents existing calendars to users. When a user accesses the calendar generator 20 through a client device 24, a username and password are provided. The data is used to query the calendar data structure 18 and determine if the user has an existing calendar on the system. According to preferred embodiments, the calendar generator 20 interacts with the calendar and event data structures 18 and 12 to present calendar data to users. Data retrieved from the calendar and event data structures 18 and 12 is formatted according to any number of formatting or markup languages. For example, the data is formatted according to Hypertext Markup language and rendered by a browser on the client device 24. Furthermore, the calendar generator 20 handles the creation of new calendars and events and provides a Graphical User Interface (GUI) to modify data.

The zip list processor and event list generator 16 provide search and retrieval functionality that allows searches over local events defined in calendars through use of the calendar generator 20. Using the GUI provided by the calendar generator 20, a user provides search data, for example, target search zip code, date, search radius, etc. The zip list processor 14 generates a list of zip codes that are geographically within the search radius of the provided zip code. The event list generator 16 uses the list of zip codes to retrieve events that are associated with the zip codes in the generated list. As is explained in greater detail, events may be marked as private events, thereby restricting the event list generator 16. According to some embodiments, the event list generator 16 queries the advertisement data structure 15 to retrieve advertisements associated with zip codes in the zip code list generated by the zip list processor. The results may be passed to the calendar generator for presentation on the provided GUI.

FIG. 2 presents a calendar data structure according to one embodiment of the present invention. Data is organized into columns and rows, with each row representing an individual record of data and each column representing a piece of the total data comprising a record. The calendar data structure 28 may be a flat file record, such as a comma or tab delimited record. According to alternative embodiments, the calendar data structure 28 may be a table in a relational database or an object in an object oriented database. Each entry in the calendar data structure 28 must be identified by a unique calendar id 30, which is used to associate events created by a user with the calendar. The username 32 and password 33 that provide access to the calendar are also stored in the data structure and used to validate identity and display the correct calendar to the intended user. Alternatively, the username 32 and password 33 data may be stored in a discrete user data structure. Additional user or calendar data can also be stored in the data structure, such as contact information for the owner of the calendar 34.

FIG. 3 presents an event data structure according to one embodiment of the present invention. Data is organized into columns and rows, with each row representing an individual record of data and each column representing a piece of the total data comprising a record. The event data structure 36 may be a flat file record, such as a comma or tab delimited record. According to alternative embodiments, the calendar data structure 36 may be a table in a relational database or an object in an object oriented database.

A unique event id 38 and an identifier indicating which calendar the event is associated with 40 identify each event stored in the data structure. Because the events occur at specific date or dates, event date data 44 is also stored here. A data field is also provided to furnish a description of the event 46. When a particular calendar is retrieved by the calendar generator 20 for presentation on a client device 24, all events associated with the particular calendar's id are retrieved and inserted into the calendar at the date the event occurs.

Calendars contain events marked as either public or private 43. Preferably, a field is populated with binary data indicating whether or not the event is a public event. Private events are not included within the set of events searched when a local search is executed. Private events only appear on the calendar of the user that the event is associated with. Conversely, events flagged as public events are included in the set of events that are searched when a local search is executed. Alternatively, events may be flagged as public but not searchable, indicating that the event appears on a user's published calendar but is not be included within the set of events searched. Each event is also associated with a specific zip code 42 that is used to define the geographic location where an event is taking place. The zip data, in conjunction with the event date data, is used to facilitate local searches across all public events contained in the Event Data Structure.

Returning to the system presented in FIG. 1, a zip list processor 14 is provided to calculate all zip codes geographically located within a specified distance from a target zip code. The component receives a target zip code as a central point for the search and a "radius", indicating the size of the search zone in relation to the specified zip code. For example, to find all local events occurring within 30 miles of Sussex, N.J., the zip code 07461 and a radius of 30 would be supplied. Because there are multiple zip codes within 30 miles of Sussex, the search operation must identify these additional zip codes and assemble them into a zip list.

The additional zip codes lying within the radius supplied by the user is determined by analysis performed by the zip list processor on data contained in the zip data structure 14. The latitude and longitude for the target zip code is retrieved from a zip data structure 13, which preferably contains a list of every zip code in the United States along with its associated latitude and longitude. The zip list processor 16 applies the distance formula presented in table 1, derived from the "Great Circle" branch of mathematics, to every other zip code latitude and longitude in the zip data structure 13.

TABLE 1

$$Distance = \frac{cos((pointAlatitude)*cos(pointBlatitude)*pi*180)* cos(pointBlongitude*pi*180-pointAlongitude) + (sin(pointAlatitude)*sin(pointBlatitude*pi*180)))*constant}{pi*180}$$

In the above equation, pointAlatitude and pointBlongitude are the latitude and longitude, respectively, for the supplied zip and where preferably the value of pi equals 3.141 and constant equals 69.097. The zip data structure is traversed, with the longitude and latitude of each zip evaluated in the equation, resulting in a list of all zip codes within the supplied radius of the target zip, e.g., a zip list.

An event list generator 16 is provided to produce a list of events from user created data stored in the event data structure 12. The event list generator 16 receives a zip list created by the zip list processor 14 defining the geographic scope for an event search. Date parameters are also provided by the user through an interface provided on the client device 24.

In accordance with the invention, the event list generator 16 queries the event data structure 12, using the date and zip parameters, to create a result set. The result set contains all events occurring in zip codes contained in the zip list and within the date scope selected by the user. The generated list data is passed to the calendar generator 20 for formatting so the data is properly displayed on the client device 24.

The event list generator 16 interacts with an advertisement data structure 15. The advertisement data structure 15 contains advertisement data including, but not limited to, graphics, text, sound, and other multimedia data used in the presentation of an advertisement. Each ad in the data structure 15 is associated with one or more zip codes. The event list generator 16 retrieves advertisements with zip codes that match zip codes contained in the zip list generated by the zip list processor 14. In this manner, only advertisements targeted to the geographic area being searched are presented to the user. The advertisements are passed with the retrieved events to the calendar generator 20 for formatting and presentation.

Figure 4:
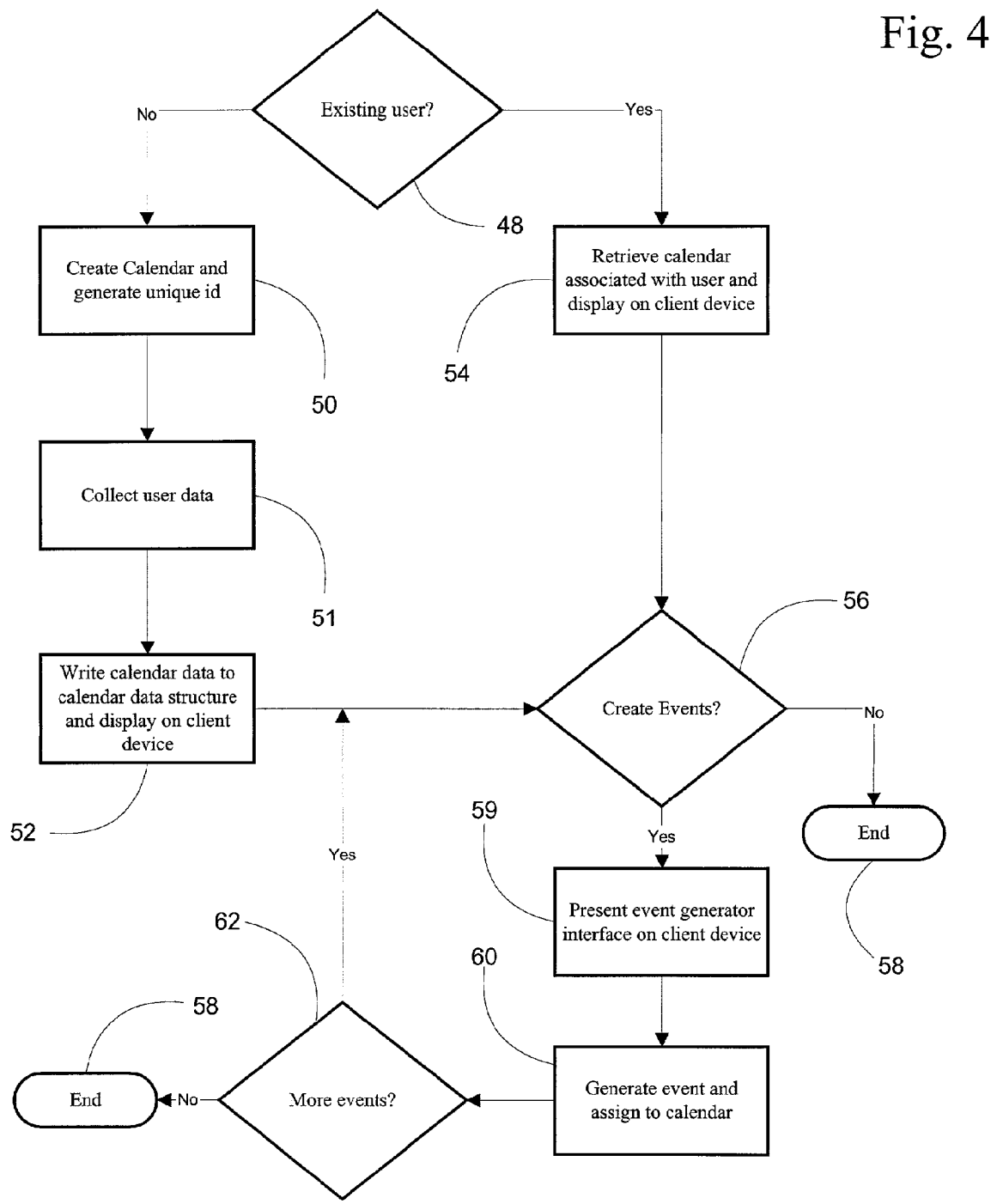
FIG. 4 is a flow diagram presenting the process of generating calendars and associated events according to one embodiment of the present invention.

One embodiment of a process executed by the above described system to generate calendars and associated events is presented in FIG. 4. When a client device accesses the calendar generator software, a check is performed to determine if the user is associated with a calendar existing on the system, step 48. If the user is recognized by the system as an existing user, their calendar and associated events are retrieved from the calendar and event data structures, respectively, and displayed on the client device, step 54.

Where the user is not recognized as an existing user, step 48, the calendar generator software generates a new calendar and assigns it a unique numeric or alphanumeric identifier, step 50. Additional data regarding the user is also collected, step 51. This data includes, but is not limited to, user id and password data, demographic data, and location data. The calendar, with miscellaneous data, is written to the calendar data structure and displayed on the client device, step 52.

The calendar is displayed on the client device and the calendar generator software waits for the user to indicate a desire to generate events within the calendar, steps 55 and 56. According to preferred embodiments, users are provided with controls by the calendar software to mark events as either public or private. Private events are associated with a user's calendar, but are not included within the result set of a search. These events appear only on the individual's calendar. Conversely, public events comprise the set of events that local searches are performed upon. These events also appear on the calendar of the user who created the event. If the user indicates that no events are to be generated, step 56, the routine ends, step 58, and the user is free to modify personal data or perform searches.

Where the user indicates that events are to be created, step 56, the calendar generator software presents an event generation interface that allows the user to identify the event as either public or private, set start and end time of the event, and provide an event description and location, step 59. Event parameters are set through the provided interface, a unique event identifier is generated and the event is recorded in the event data structure, step 60. The event is written to the event data structure and a check is performed to determine if additional events are to be generated, step 62. If additional events are to be generated, processing returns to step 59 and the user is again presented with the event generation interface. Where no more events are to be generated, step 62, the routine ends, step 64.

Figure 5:
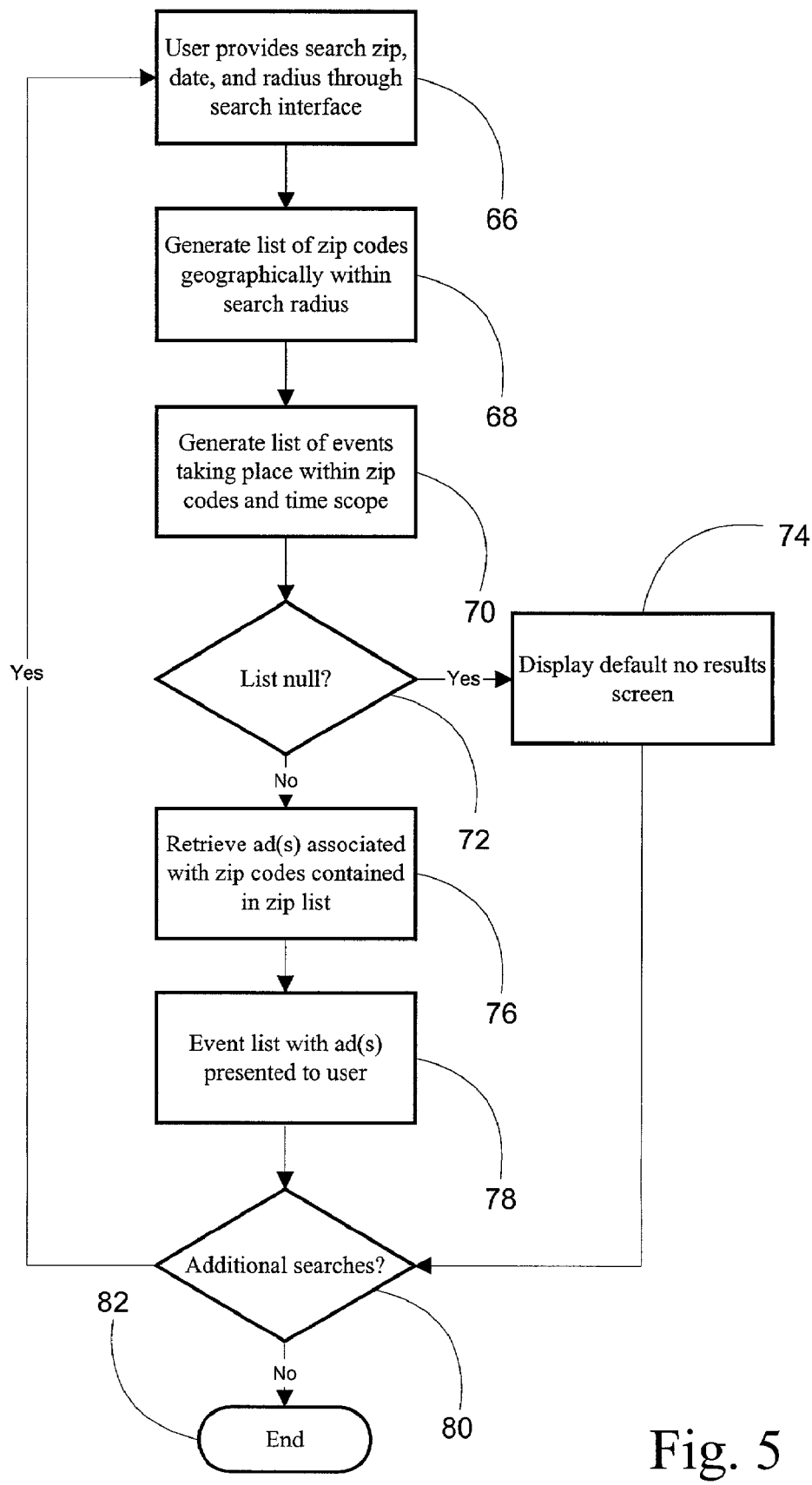
FIG. 5 is a flow diagram presenting the process of searching for events contained within user calendars located within an indicated radius of a particular zip code.

Turing to FIG. 5, an embodiment of a process executed by the invention to perform geographic searches on the public events contained within calendars. The calendar generator software provides a search interface. According to preferred embodiments, a user interacts with the interface to supply search parameters including a zip code, search radius, and start and end dates for the search, step 66. Alternatively, the search radius can be set in terms of time, e.g., 30 minutes, which is converted into a unit of distance based on a set of predetermined assumptions. Zip codes may also be substituted with other geographic locators, such as area codes or town names. Any method selected for determining geographic location of an event must be associated with its latitude and longitude, e.g., location on the earth, so the zip list processor can perform its function properly.

The zip list processor receives a selected zip code and radius as parameters. Using these parameters, the processor calculates all zip codes that lie geographically within the radius of the supplied zip code, step 68. For example, if a user supplied the zip code 10019 with a radius of one mile, the zip list processor returns a list of all zip codes that lie geographically within one mile of zip code 10019. This list of zip codes determines the geographic scope of events that comprise the event list ultimately generated by the method.

The zip list generated by the zip list processor is passed as input to the event list generator. Using the input, the event list generator queries the event data structure and retrieves all public events that are associated with zip codes contained in the zip code list and occur within the start and end dates supplied by the user through the search interface, step 70. For example, if a user searches for all events within one mile of 10019 from Jan. 1 to Jan. 31, 2001 and three events are found within the event data structure that match the supplied parameters, the events are recorded in an event list. Preferably, this event list is stored in transient memory so as to provide quick and efficient access to the list. Alternatively, this list may be held in persistent memory.

A check is then performed to determine if the event list returned by the event list generator is null, step 72. If the event list contains not events, e.g., no events are taking place within the specified number of miles of the supplied zip code during the supplied dates, a default "no results" screen is presented to the user, step 74. According to some embodiments, the default screen presented to the user when no events are found contains advertisements associated with the zip codes returned by the zip list generator. A check is made to determine is additional searches are desired, step 80. If additional searches are requested, processing returns to step 66 and the method is repeated.

Processing continues where the event list generator finds events that take place in zip codes contained in the zip list during the selected dates, step 72. The event list generator retrieves one or more advertisements from an advertisement data structure, step 76. The selected advertisements are those associated with one or more of the zip codes contained in the zip code list. This allows local businesses to target their advertisements towards users that have expressed an interest in a particular local geographic location. Alternatively, algorithms may be applied to randomly select a predetermined number of advertisements that are targeted to the selected zip codes or advertisements may contain a priority code and, based upon the priority code, certain advertisements are selected more often than others are. Providing a mechanism that gives priority to certain advertisements produces an additional revenue stream in that advertisers drive up the price of advertising in particularly desirous zip codes.

The calendar generation software merges the event and advertisement lists and presents them to the user in a unified fashion, step 78. According to various embodiments, one or more advertisements are appended before and after a list of events occurring within the selected zip codes during the supplied dates or the advertisements may all come before or after the event list. Furthermore, selecting any event in the event list causes the calendar generation software to retrieve additional information regarding the event from the event data structure. Similarly, selecting an advertisement retrieves additional information regarding the product or service advertised. A check is performed to determine if additional searches are required by the user, step 80. If additional searches are required, processing returns to step 66 and the method is repeated. The routine ends if no additional searches are required, step 82.

Figure 6:
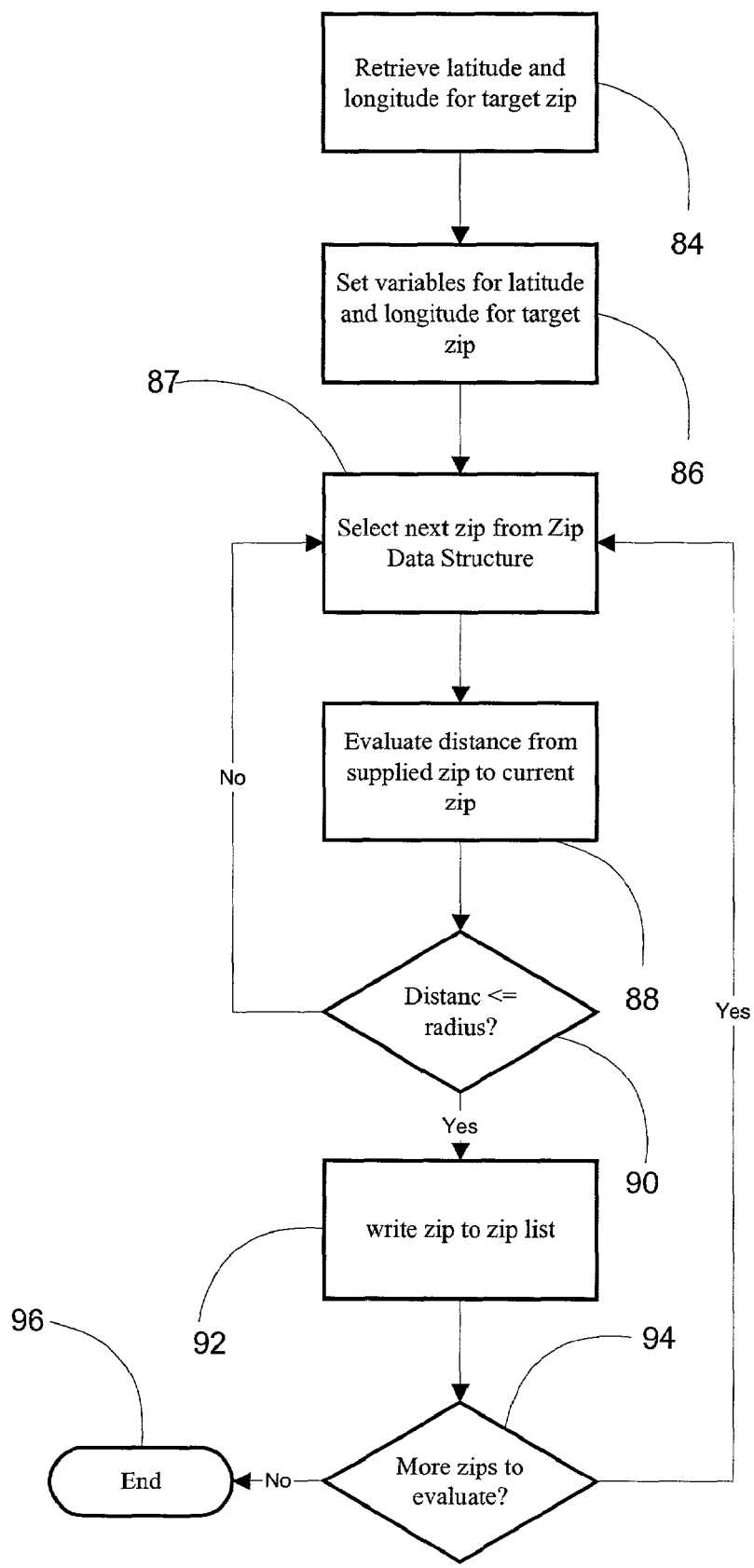
FIG. 6 is a flow diagram presenting the process of determining all zip codes that lie within a given radius of a target zip code.

FIG. 6 details the method executed by the zip list generator to determine all zip codes that lie within a supplied distance of a selected zip code. The longitude and latitude of the supplied zip code is calculated, step 84. Variables are set for the calculated longitude and latitude of the supplied zip code, step 86. The next zip code is selected from the zip data structure, step 87. Using the latitude and longitude of both the supplied zip code and the zip code selected from the zip data structure, the distance between the two is calculated according the supplied formula, step 88. If the distance, between the supplied and selected zip codes is less than or equal to the radius distance supplied by the user, step 90, the zip code is written to the zip code list, step 92. Where the distance is greater than the supplied radius, step 90, or there are additional zip codes to evaluate, step 94, processing returns to step 87 and the distance formula is evaluated using the next zip code contained in the zip data structure. Once the supplied zip code has been evaluated against every entry in the zip data structure, a list is created that contains all zip codes within a certain distance of a supplied zip code and processing ends, step 96.

Figure 7:
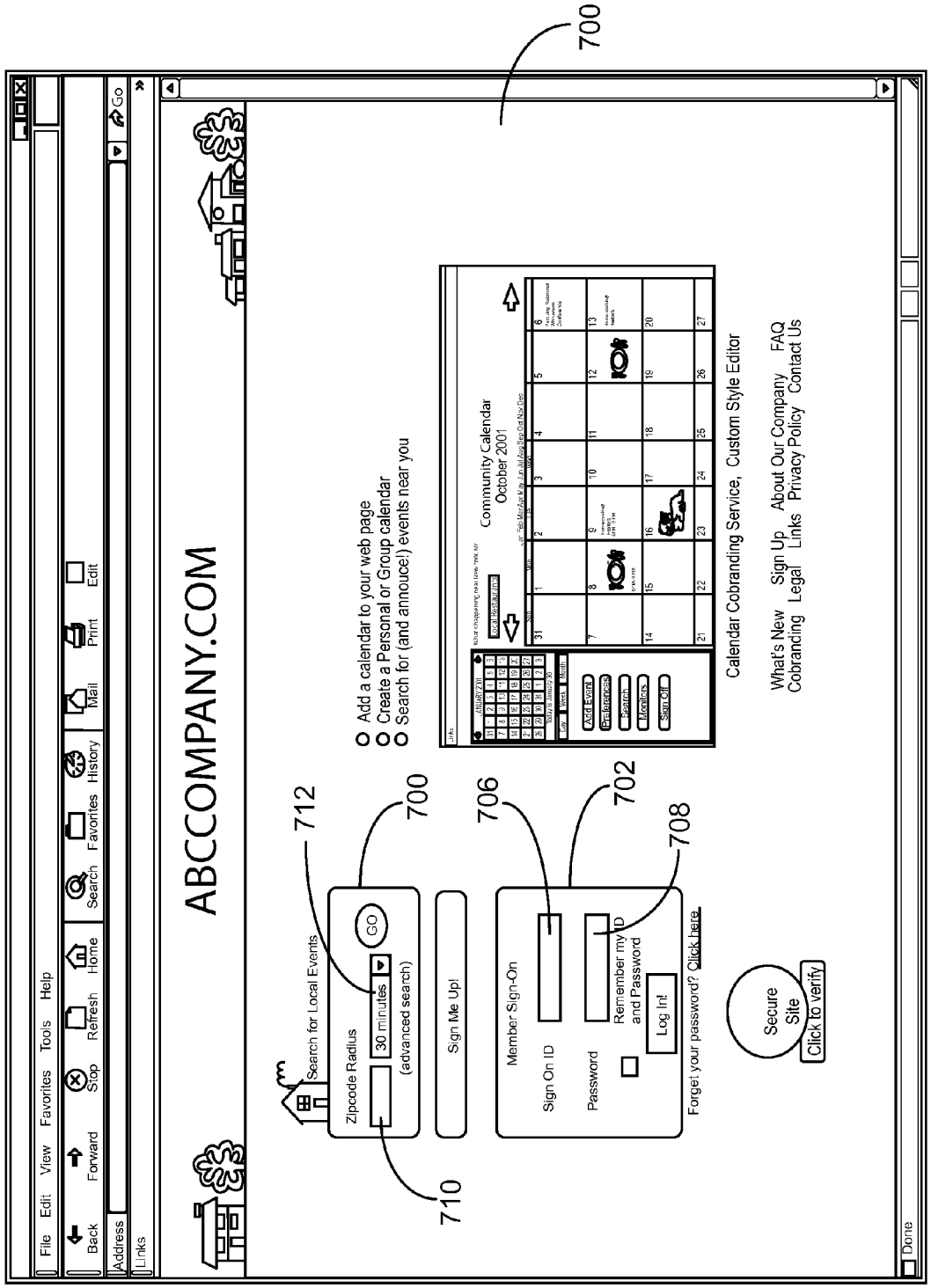
FIG. 7 is a screen diagram presenting one embodiment of a home page for an information system configured according to the present invention.

FIGS. 7 through 12 present screen diagrams illustrating a web based information system comprising embodiments of the invention. Turning to FIG. 7, a home page presenting a calendar system of the present invention comprises a search tool 700 and a sign-on tool 702. Through the search tool 700, a user provides a target zip code 710 and a search radius 712. Selection of the "go" control passes these data to the zip list processor and event list generator to retrieve local events within the search radius of the provided zip code, e.g., as described in FIGS. 5 and 6. Users who are registered with the system and have previously generated calendars may retrieve them through use of the sign-on tool 702. A user supplies their sign-on id 706 and a password 706. Selection of the login control causes the calendar generator to retrieve the calendar associated with the user's sign-on id 706.

Figure 8:
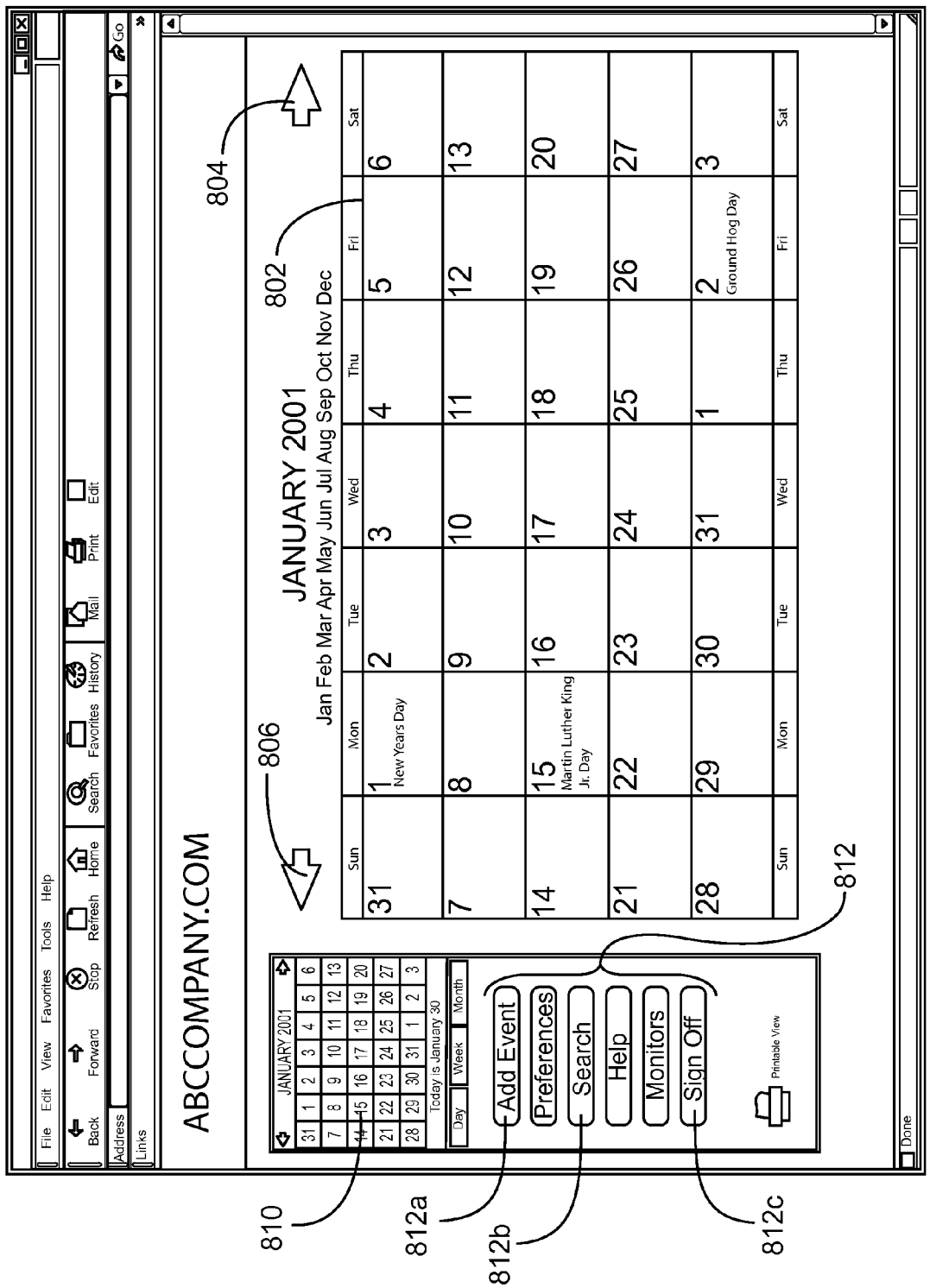
FIG. 8 is a screen diagram presenting a personal calendar according to one embodiment of the present invention.

When a user initially creates an account with the information system, a new calendar is created in the calendar data structure and associated with the user's sign on id. FIG. 8 illustrates a new calendar 802 presented by the calendar generator. Grouped along the lower left side of the display are a series of system action and navigation controls 812. For example, a user may choose to add events 812*a* to their calendar 802, exit their own calendar 802 to execute searches for local events 812*b* associated with calendars that belong to other users, or exit the system 812*c*. A composite of the current month is displayed 810, allowing the user to select a hyperlink contained therein that retrieves and displays any events in the user's calendar 802 that are associated with the selected day. Additional months may be retrieved for display by the calendar generator through selection of the next month 804 and previous month 806 controls.

Figure 9:
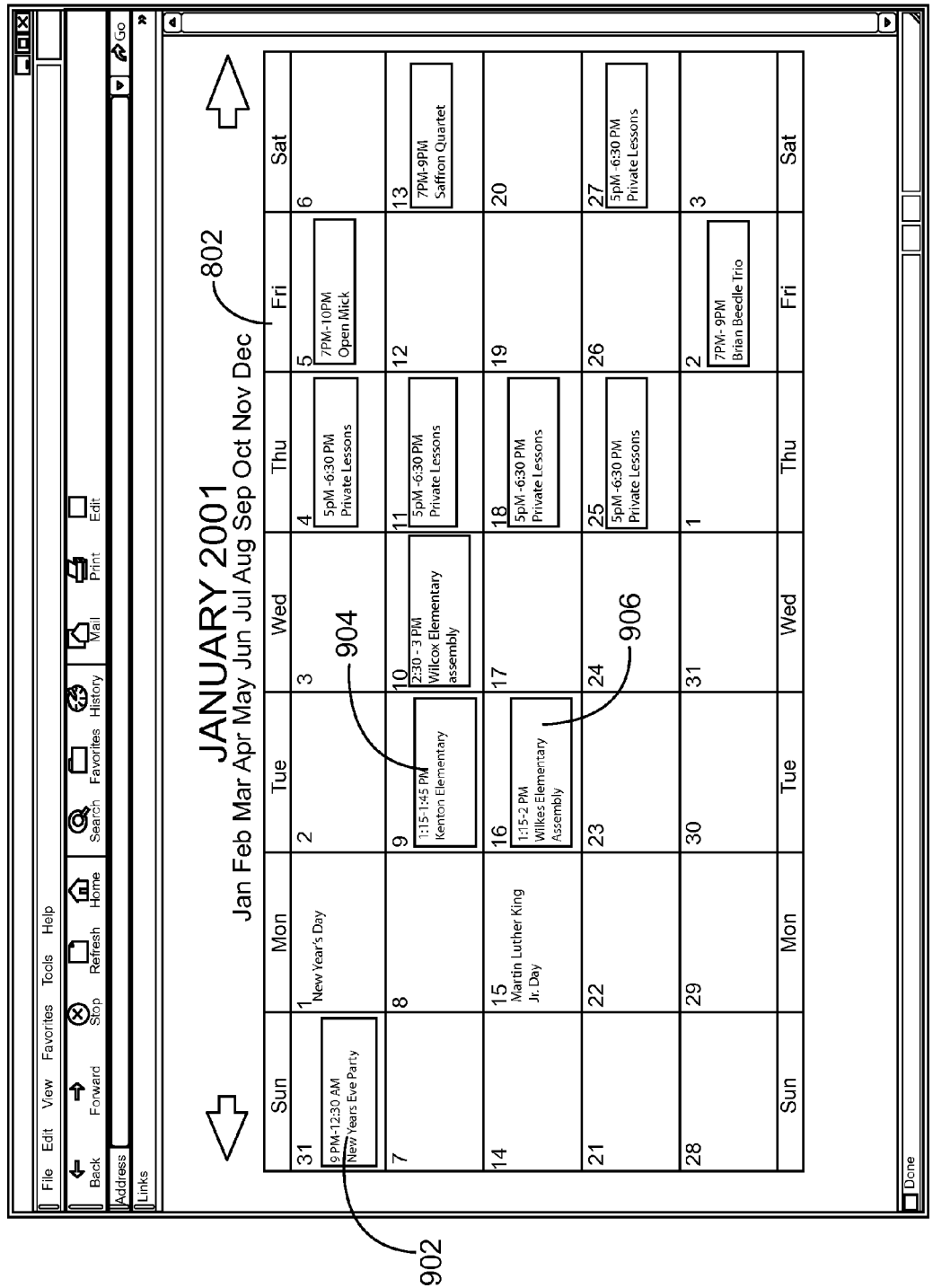
FIG. 9 is a screen diagram presenting a personal calendar populated with user defined events according to one embodiment of the present invention.
Figure 10:
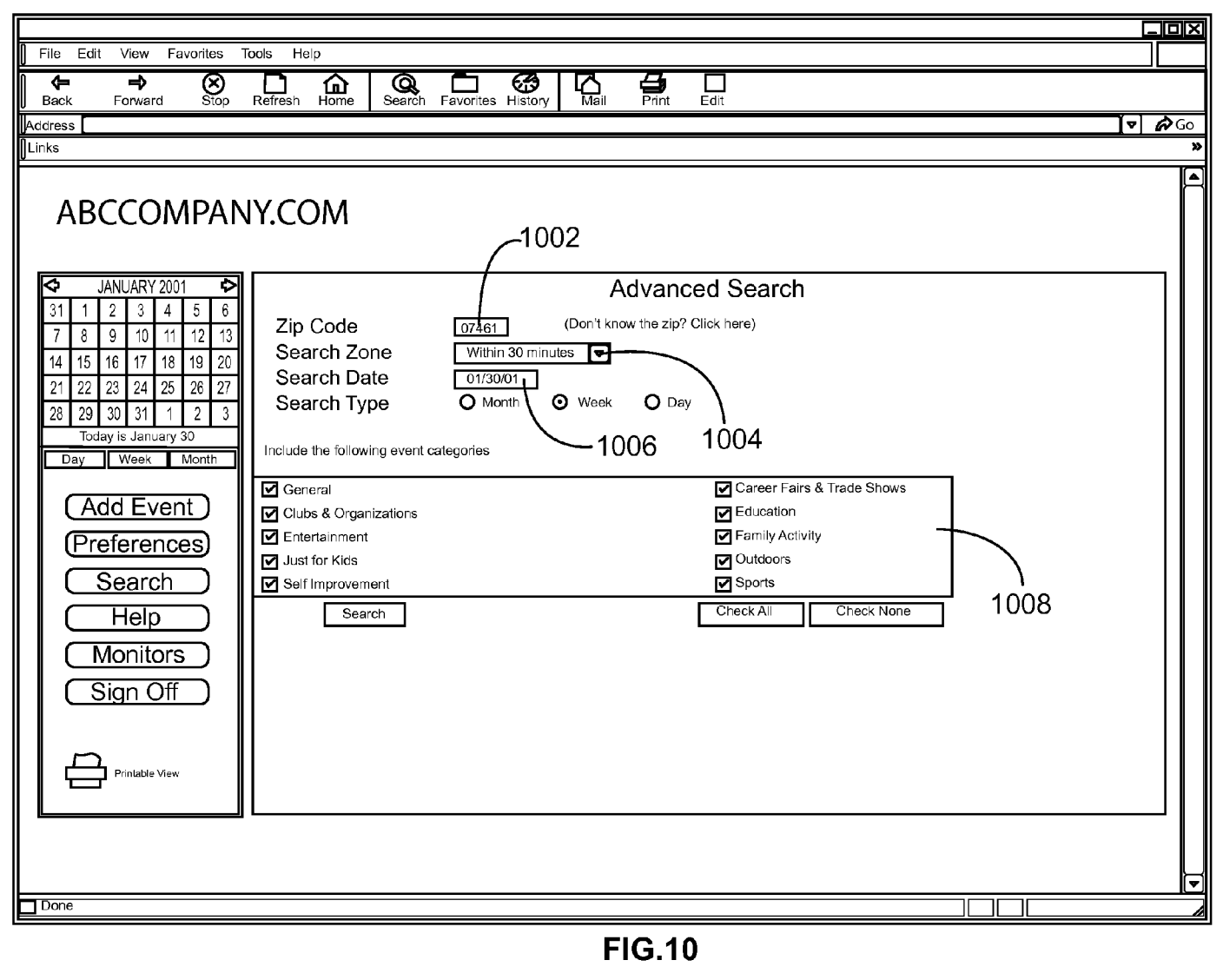

FIG. 9 builds on the new, unpopulated calendar 802 presented in FIG. 8. Through use of controls 812 providing access to an add event subsystem provided by the calendar generator, the user has added a plurality of events 902, 904, and 906 to the calendar 802. Although not indicated in the present illustration, events may be marked as private events that, although they appear in the individual user's calendar, do not for the set of events searched for and retrieved by the system and method of the present invention In addition to the basic search controls, an embodiment of a control for which is illustrated in FIG. 7, advanced searches may be performed by the user. FIG. 10 presents one embodiment of such as search tool. Controls are provided for the user to supply a target zip code 1002 on which the local event search is conducted. Also shown is a control to provide a search radius 1004 around the target zip code to from which to return local events. The search may also be narrowed down to a particular date 1006. As events in certain embodiments may be associated with categories, a plurality of checkboxes 1008 are provided over which the search may be further focused. These data are provided to the zip list processor and event list generator, which use it to create a query that retrieves local events falling within the scope of the query. The results are presented to the user as illustrated in FIGS. 11 and 12.

Figure 11:
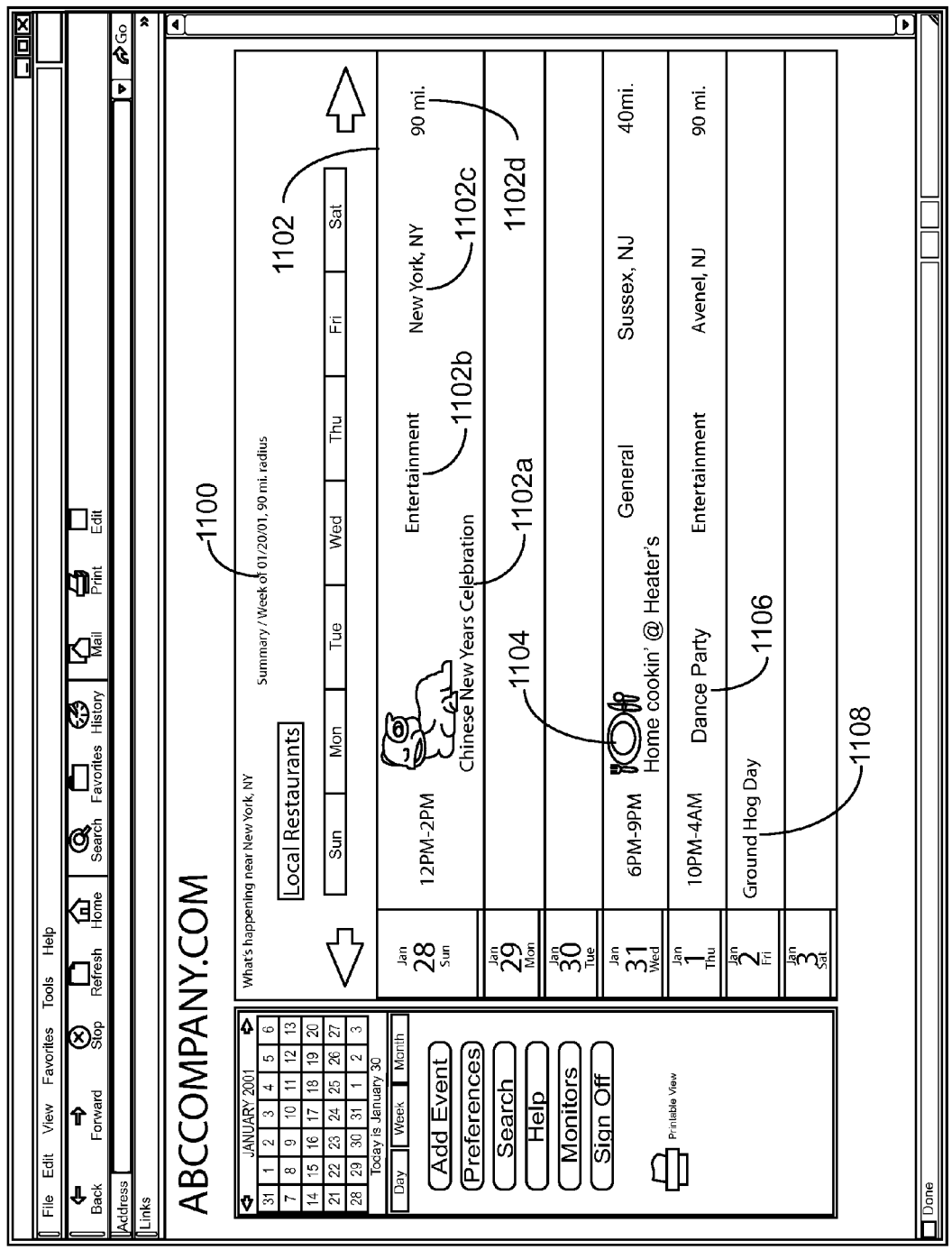
FIG. 11 is a screen drawing presenting a search result according to one embodiment of the present invention.
Figure 12:
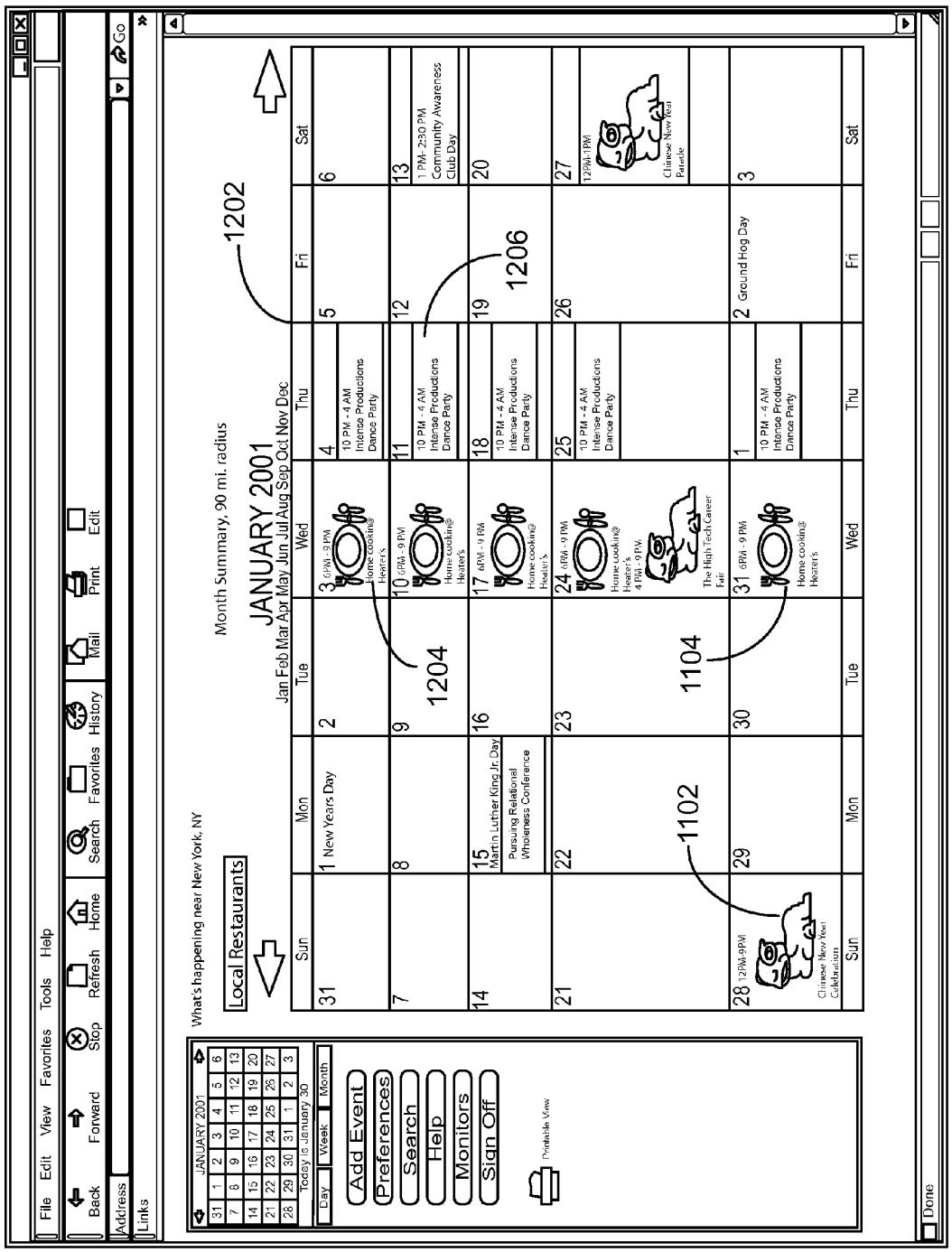
FIG. 12 is a screen drawing presenting a search result according to one embodiment of the present invention.

FIG. 11 presents the results of a local search executed by the user on all events taking place within a 90-mile radius of a selected zip code in New York City 1100. The calendar generator presents the results here as a "one week" view, e.g., all the events taking place the week of Jan. 28, 2001. Local event data is presented for those days that local events fall on. An event 1102 may comprise the name of the event 1102a, a category for the even 1102b, a general metropolitan location where the event is taking place 1102c, and the distance of the event from the target zip code 1102d. In addition to events taking place on other days of the same week that are returned to the calendar generator for presentation, the calendar generator may be provided with the dates of major holidays for inclusion in any search result set or other calendar presentation. FIG. 12 returns data from the same result set, but presented in a "one month" view 1202. Data from the previous format 1102 and 1104 is displayed according to their event dates, in addition to other event data 1202, 1204, and 1206 for other events occurring during the same month.

Figure 13:
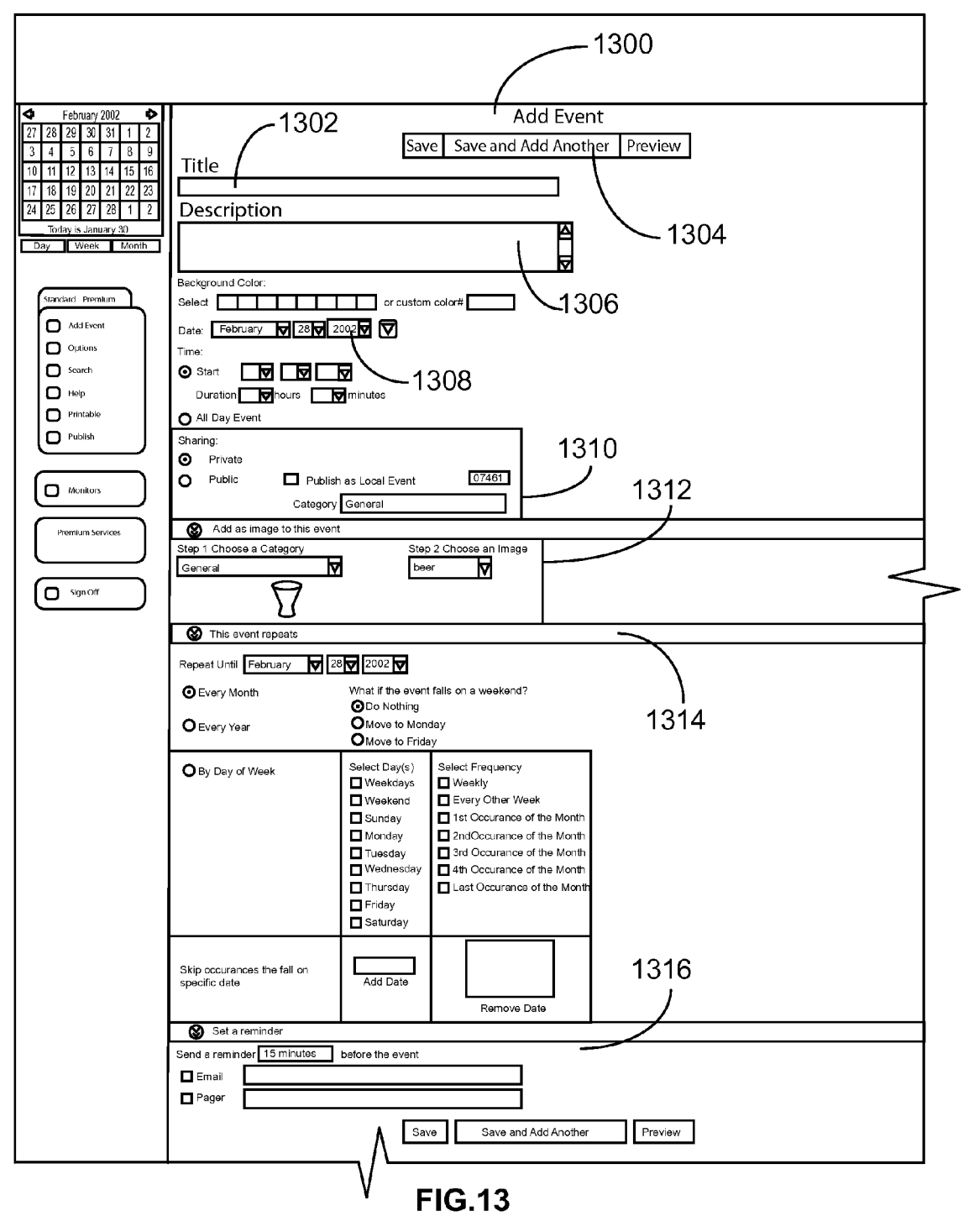

Turning now to FIG. 13, one embodiment of an interface for adding new events to a user calendar 1300 is presented. Text entry controls are provided that allow a user to provide a tile 1302 and description 1304 for a new event added to a calendar through the interface 1300. The user may also define additional parameters regarding the event, such as the data and time when the event occurs 1308. Each event may also be defined as public or private, as well as be associated with a zip code where the event is geographically taking place and a category 1313. An icon representing the event is optionally defined 1312, as well as parameters indicating the frequency that the event repeats in the future 1314. According to this embodiment, a reminder may be defined, causing the calendar generator or other responsible subsystem to generate and transmit a reminder on or before the beginning of the event 1316. When the event has been defined, the user selects a save control 1304, causing the calendar generator to associate the event with a particular calendar and write the event to the event data structure.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A system for performing searches across user defined events for an arbitrary geographic region or regions, the system comprising:
   a server computer coupled over a computer network to a plurality of client devices, the server operable at least to:
   maintain an event data structure comprising a plurality of user defined events, each of the plurality of events in the data structure comprising a zip code, a unique calendar identification that identifies an event as belonging to a calendar of one of a plurality of users, an event identification, an event date, an indication, an event description, and an indication whether the event is a private event;
   receive a zip code and a distance value from the at least one client device; calculate a zip list comprising zip codes geographically located within the distance value from the zip code using a zip data structure comprising zip codes and associated latitude and longitude values;
   receive the zip list and query the event data structure; and retrieve events associated with zip codes contained in the zip list.

2. The system of claim 1 wherein the zip list processor utilizes great circle mathematics to calculate all zip codes geographically located with the distance value from the zip code.

3. The system of claim 1 comprising a calendar generator to facilitate creation of a calendars and a calendar data structure.

4. The system of claim 3 wherein the each of the one or more user defined events are associated with a calendar in the calendar data structure.

5. The system of claim 4 wherein the calendar generator is operative to format and present the calendar and associated user defined events on a display device.

6. The system of claim 1 wherein the one or more user defined events are marked as public or private events.

7. The method of claim 6 wherein private events are excluded from the query performed by the event list generator.

8. A method for performing searches across user defined events for an arbitrary geographic region or regions, the method comprising:
   creating an event data structure comprising one or more user defined events, each of the plurality of events in the data structure comprising a zip code, a unique calendar identification that identifies an event as belonging to a calendar of one of a plurality of users, an event identification, an event date, an indication, an event description, and an indication whether the event is a private event;
   calculating a zip list comprising all zip codes geographically located within a distance equal to a received distance value from a received zip code using a zip data structure comprising zip codes and associated latitude and longitude values; and
   querying the event data structure to retrieve events associated with zip codes contained in the zip list.

9. The method of claim 8 wherein calculating comprises utilizing great circle mathematics to calculate all zip codes geographically located with the distance value from the zip code.

10. The method of claim 8 comprising generating a calendar data structure and one or more calendars through the use of a calendar generator.

11. The method of claim 10 comprising associating each of the one or more user defined events with a calendar in the calendar data structure.

12. The method of claim 11 comprising formatting and presenting the calendar and associated user defined events on a display device.

13. The method of claim 8 comprising marking the one or more user defined events are marked as public or private events.

14. The method of claim 13 wherein querying excludes private events.

15. A system for performing searches across user defined events for an arbitrary geographic region or regions, the system comprising:
   a server computer coupled over a computer network to a plurality of client devices, the server operable at least to:
   maintain an event data structure comprising a plurality of user defined events, each event in the data structure comprising a unique calendar identification that identifies particular events as belonging a calendar of one of a plurality of users, a zip code location of the event, an event identification, an event date, an event description, and an indication from the one of the plurality of users that created the event that the event is one of a public event and a private event, the calendar of the at least one user comprising at least one private event and at least one public event;
   receive a zip code and a distance value from the at least one client device;

calculate a zip list comprising zip codes geographically located within the distance value from the zip code using a zip data structure comprising zip codes and associated latitude and longitude values;

receive the zip list and query the event data structure; and retrieve events associated with zip codes contained in the zip list, wherein the server queries the data structure for the at least one private event only for the at least one user that created the private event and for the at least one public event for all users.

16. the system of claim 15, the data structure further comprising a second plurality of user defined events, each of the second plurality of events associated with an indication that the event is a public non-searchable event, the calendar of the at least one user comprising at least one non-searchable private event, wherein the server queries the non-searchable public event only for the user that created the event and for a published calendar of the at least one use.

* * * * *

UNITED STATES PATENT AND TRADEMARK OFFICE
CERTIFICATE OF CORRECTION

| | |
|---|---|
| PATENT NO. | : 7,970,751 B2 |
| APPLICATION NO. | : 12/572544 |
| DATED | : June 28, 2011 |
| INVENTOR(S) | : William McBride Fesq and Michael Emil Ogrinz |

It is certified that error appears in the above-identified patent and that said Letters Patent is hereby corrected as shown below:

Column 9, lines 56 through 57 – replace "the at least one client device" with -- at least one of the plurality of client devices --.
Column 9, line 59 – before "zip code", insert -- received --.
Column 9, line 64 – replace "wherein the zip list processor" with -- the server computer --.
Column 9, line 66 – before "zip", insert -- received --.
Column 10, lines 3 through 4 – replace "the each of the one or more" with -- each of the plurality of --.
Column 10, line 9 – replace "the one or more" with -- a plurality of --.
Column 10, line 11 – replace "method" with -- system --.
Column 10, lines 12 through 13 – replace "event list generator" with -- the server computer --. Column 10, line 18 – replace "plurality of" with -- one or more user defined --.
Column 10, line 33 – before "zip", insert -- received --.
Column 10, lines 63 through 64 – replace "at least one user" with -- one of the plurality of users --.
Column 10, lines 66 through 67 – replace "the at least one client device" with -- at least one of the plurality of client devices --.
Column 11, line 2 – before "zip code", insert -- received --.
Column 12, line 7 – replace "user" with -- one of the plurality of users --.
Column 12, line 8 – replace "at least one use" with -- one of the plurality of users --.

Signed and Sealed this
Twenty-seventh Day of March, 2012

David J. Kappos
*Director of the United States Patent and Trademark Office*